A. JOHNSTON.
GEAR WHEEL.
APPLICATION FILED MAR. 12, 1908.
951,503.
Patented Mar. 8, 1910.
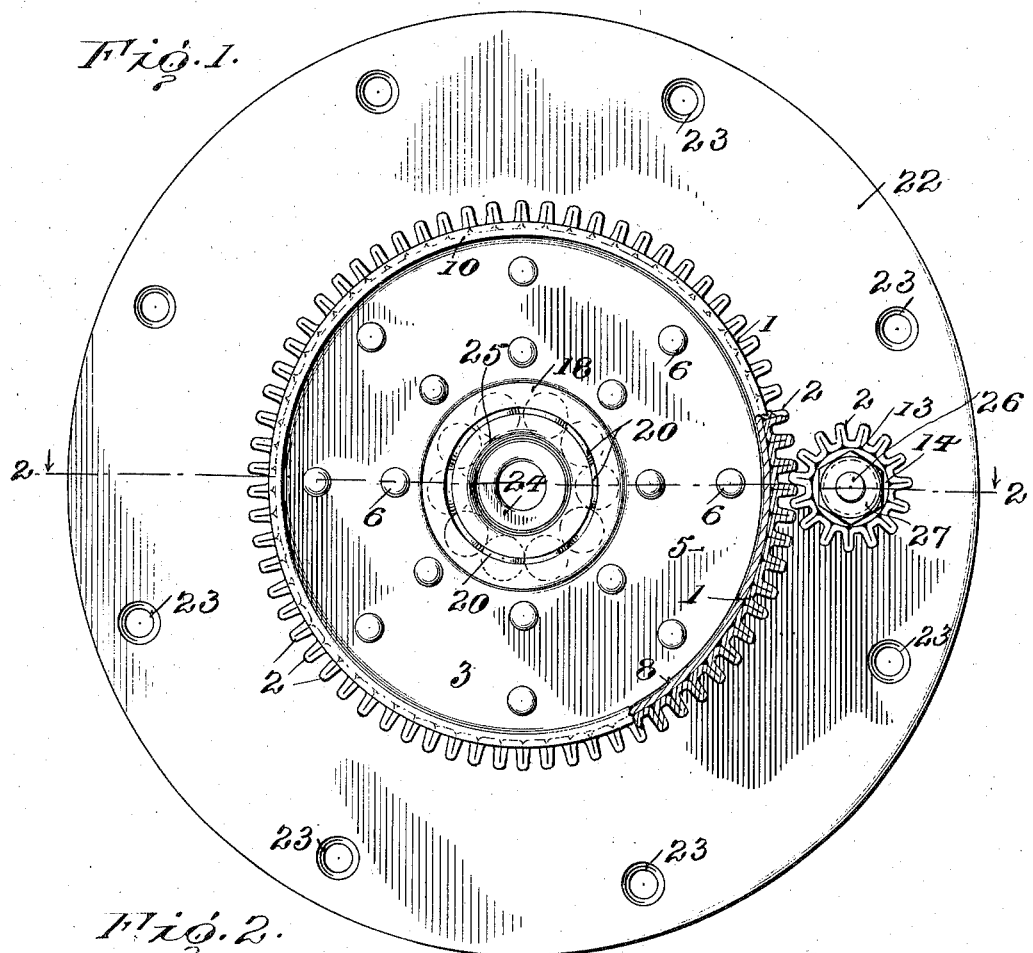
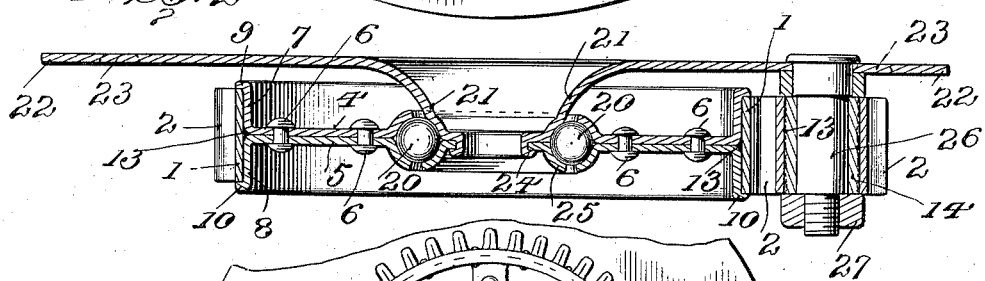
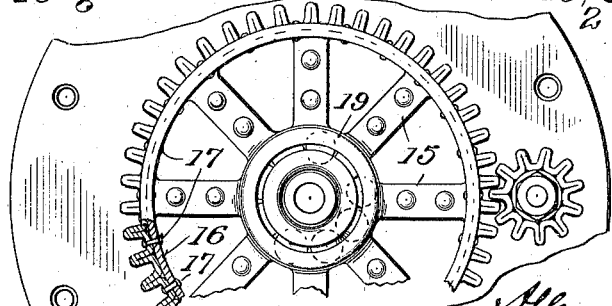
Witnesses
Ruth C. Fitzhugh
G. R. Thompson
Inventor
Allen Johnston,
by
Mauro, Cameron, Lewis Massie,
Attorneys.

UNITED STATES PATENT OFFICE.

ALLEN JOHNSTON, OF OTTUMWA, IOWA.

GEAR-WHEEL.

951,503.

Specification of Letters Patent.

Patented Mar. 8, 1910.

Application filed March 12, 1908. Serial No. 420,690.

*To all whom it may concern:*

Be it known that I, ALLEN JOHNSTON, of Ottumwa, Iowa, have invented a new and useful Improvement in Gear-Wheels, which invention is fully set forth in the following specification.

This invention relates to gear-wheels, and has for its object to provide a gear-wheel which shall be light, strong, rigid in all its parts, and that may be cheaply constructed.

Heretofore it has been proposed to construct gear-wheels by fluting or bending a strip of sheet metal and fastening the same upon a suitable rim or other support, the fluting constituting the teeth of the gear-wheel, and, in some cases, the flutings or bends have been filled with elastic material. The result of these constructions has been that the gear-wheel is more or less elastic or yielding in character.

One of the prime objects of my invention is to provide a gear-wheel of this general character which shall be rigid, that is, in which neither the body of the wheel nor the teeth thereof shall yield or spring when in operation, thereby materially improving the accuracy and smoothness with which said wheel acts, or a series of said wheels act, upon each other. With this object in view, I take a strip of sheet-metal, preferably, though not necessarily, in the form of a closed integral ring, and preferably of steel, and bend the same by means of dies, or any other suitable tool, to form the teeth of my gear-wheel. Preferably the teeth of the gear-wheel are formed from metal of such thickness that when the metal is bent sharply upon itself and the two adjacent surfaces brought together they will form a rigid tooth of the proper size. Instead of bending the metal so that the adjacent surfaces of the metal constituting each individual tooth actually contact, I may, and sometimes do, employ a thinner sheet of metal and bend the metal so that said surfaces do not contact, and then fill the intervening space with some solid, rigid and non-elastic material such as solder, for example, thereby securing a solid, non-yielding, non-elastic construction. The toothed portion of the wheel being thus formed, the same is united to the interior or supporting body portion of the wheel in any manner suitable for securing a firm, rigid construction. For example, in a small wheel, a suitable rim or thimble whose external diameter is such that it may be slipped within the toothed annulus is inserted therein and soldered, riveted or otherwise firmly secured thereto. With larger wheels, the interior body portion of the wheel may be formed of oppositely disposed sheet-metal portions riveted together and clamped, soldered or riveted to the annular toothed portion of the wheel, said oppositely disposed sheet-metal portions constituting a web with an axial opening for the wheel bearing or shaft. Or, if desired, the annular toothed portion may be mounted upon spokes extending radially from an annular central bearing portion of the wheel to said annular toothed portion and secured to the rim in any suitable manner, as by soldering, riveting or clamping the same thereto.

The inventive idea involved is capable of receiving a variety of mechanical expressions, some of which, for the purpose of illustrating the invention, are shown in the accompanying drawings, in which—

Figure 1 is a side elevation, partly in section, showing a large and a small radially toothed gear-wheel made according to my invention, said wheels intermeshing; Fig. 2 is a horizontal transverse section on the line 2—2, Fig. 1; and Fig. 3 is a broken side elevation, partly in section, illustrating a slightly different embodiment of the inventive idea.

Referring to the drawings, in which like reference numerals indicate like parts, 1 is the toothed annular portion of the wheel, here shown as formed from a closed ring of sheet-metal, preferably sheet-steel, each of the teeth of said section being formed by bending the metal upon itself so that its adjacent surfaces contact, as shown at 2. This bending of the teeth so as to close the adjacent surfaces against each other may be effected by a die, or by the use of other suitable tools, and, if desired, instead of being formed from a closed integral ring of sheet-metal, may be formed from a strip of sheet-metal which is subsequently bent into annular form. I prefer, however, to employ the integral ring as the blank from which the toothed annular portion of the wheel is constructed.

As shown in Figs. 1 and 2, the interior body portion of the wheel is formed or composed of a web 3 of sheet-metal, which web is made up of two sheet-metal portions 4 and 5 secured together by rivets 6, 6. At the outer portion of said web the sheet-metal is bent at right-angles to the web 3, as shown at 7 and 8, and then has its extreme outer edges again bent at right-angles to the parts 7 and 8, thereby affording narrow flanges 9 and 10 which serve to clamp the toothed annular portion 1 between them. The toothed annular portion 1 is secured in place on the web portion either by the clamping action of the flanges 9 and 10, or by solder, as shown at 11, Fig. 2, or, if desired, it may be secured by rivets (not shown). If deemed advisable, all three of these methods, viz., clamping, soldering and riveting may be employed.

Referring to Figs. 1, 2 and 3, 12 is a toothed annular portion of a wheel formed by bending sheet-metal upon itself, so that throughout the greater portion of its extent the adjacent surfaces of the metal forming each tooth contact, or nearly contact, with each other, while the intervening space is filled by any suitable rigid material, as by solder 13, which solder may be employed not only to fill the intervening spaces, and thus render the wheel rigid, but may also serve to secure the toothed annular portion to an interior ring or body portion 14.

Instead of employing the web 3 of Figs. 1 and 2, or the ring 14, the wheel may be provided with spokes 15, Fig. 3, extending from the axial portion of the wheel to the toothed annular portion thereof, or preferably to an interior ring 16 suitably secured to the toothed annular portion, as by rivets 17.

Whether the wheel is provided with the web 3, the ring 14, or the spokes 15, it has at its axis an opening for supporting it upon its bearing. As here shown, the web construction and the spoke construction of Figs. 1, 2 and 3 are provided with ball-bearings 18, the ways for the bearings being provided by striking-up the interior edges of the web 3 or of the annular portion 19 to which the spokes 15 are secured, and said balls rest in a suitable race-way provided for them and within which the shaft, or other bearing for the wheel, is inserted. As here shown, the interior track or way for the ball-bearings 20 is composed in part of an inwardly projecting portion 21 of a plate 22 provided with openings 23, by means of which said plate may be secured, as by screws, to any suitable supporting structure. This entire plate is preferably of sheet-metal with the inwardly projecting portion 21 struck-up therefrom and clamping at its extreme inner edge 24 around the inner edge of a suitably formed sheet-metal plate 25 also forming a part of the interior portion of the race-way for the balls 20.

Instead of the ball-bearing structure shown in connection with the larger wheel in Figs 1, 2 and 3, the wheel may be keyed to a shaft or be mounted to turn upon a shaft, as stub-shaft 26, shown as the bearing for the smaller wheel at the right of each of said figures, the wheel being held in place on said shaft in any suitable manner, as by a nut 27.

It will be observed that a wheel constructed as thus described may be made entirely of sheet-metal, such as sheet-steel, with teeth as accurately formed as the same would be if they were cut with an ordinary gear-cutter; that the interior portion of the wheel, whether composed of the ring or the web of Figs. 1 and 2, or the spoke construction of Fig. 3, can also be composed of sheet-metal, all of the parts being readily struck from the sheet-metal blanks and united by pressing, riveting, or otherwise. By these means a wheel of great rigidity of construction is secured from cheap material, and at a minimum expenditure of time, money and power.

By bending the metal upon itself so that its adjacent portions contact, or, if they fail to contact, by filling the intervening space with a non-yielding, non-elastic material such as solder, a rigid construction is assured which will not give or yield under the stress of the work imposed upon the wheel, thereby insuring smoothness and accuracy in the operation of the wheel.

While, for the purpose of illustrating the invention, I have shown the same embodied in an ordinary spur-gear with radial teeth, it will, of course, be understood that the invention is not limited to this specific form of gear-wheel, since it is equally applicable to crown, bevel, involute, internal, and other forms of gears, and the claims herein, unless otherwise distinctly so stating, are not to be taken as limited to the special form of wheel shown in the drawings.

What is claimed is:—

1. A gear-wheel having a sheet-metal toothed portion, each tooth being composed of sheet metal bent upon itself until its adjacent surfaces contact.

2. A gear-wheel having a sheet-metal toothed portion the teeth of which are composed of sheet metal bent upon itself until its adjacent surfaces contact, and a rigid body portion to which said toothed portion is secured.

3. A gear-wheel having a sheet-metal toothed portion the teeth of which are composed of sheet metal bent upon itself until the adjacent surfaces contact, and a sheet-metal body portion to which said toothed portion is secured.

4. A gear-wheel composed of a rigid body portion having a ball-bearing raceway, a sheet-metal rigid-toothed portion, and a rigid connection uniting said body portion and said toothed portion.

5. A gear-wheel composed of a rigid sheet-metal body portion having a ball-bearing raceway integral therewith, a sheet-metal rigid-toothed portion, and a rigid connection uniting said body portion and said toothed portion.

In testimony whereof I have signed this specification in the presence of two subscribing witnesses.

ALLEN JOHNSTON.

Witnesses:
L. E. STEVENS,
THOS. E. RODGERS.